United States Patent [19]
Burch

[11] Patent Number: 5,732,900
[45] Date of Patent: Mar. 31, 1998

[54] TOOL INCLUDING A WINDING SPINDLE FOR WINDING AND FORMING DYNAMOELECTRIC MACHINE FIELD WINDINGS

[75] Inventor: Jerry Clay Burch, Canoga Park, Calif.

[73] Assignee: Electrowind, Inc., Chatsworth, Calif.

[21] Appl. No.: 550,177

[22] Filed: Oct. 30, 1995

[51] Int. Cl.$^6$ ............................................. B65H 81/06
[52] U.S. Cl. ......................... 242/432.5; 242/432.6; 29/596; 29/736
[58] Field of Search ........................... 242/432.3, 432.4, 242/432.5, 432.6; 29/736, 732, 596, 605

[56] References Cited

U.S. PATENT DOCUMENTS

| | | | |
|---|---|---|---|
| 2,998,937 | 9/1961 | Potter et al. | 242/432.3 |
| 3,334,825 | 8/1967 | Friedrich | 242/432.6 |
| 4,724,604 | 2/1988 | Kawazoe et al. | 29/736 X |
| 5,113,573 | 5/1992 | Taji et al. | 29/596 |
| 5,316,227 | 5/1994 | Oohashi et al. | 29/736 X |

Primary Examiner—Daniel P. Stodola
Assistant Examiner—Emmanuel M. Marcelo
Attorney, Agent, or Firm—Biebel & French

[57] ABSTRACT

A winding and forming tool attachable to a winding machine spindle shaft for reciprocating movement along and rotational movement about a longitudinal axis thereof includes an elongated winding spindle having a pair of longitudinally spaced apart, generally radially extending slots therethrough, and a pair of forming racks each being slidably disposed within a respective one of the generally radially extending slots. A rotatable spline shaft is at least partially disposed within the winding spindle for engaging the forming racks in a manner causing sliding movement of the forming racks along the slots to extend and retract them relative to an external surface of the winding spindle. A wire is guided internally through the winding spindle from one end thereof to an aperture in a radially facing external surface of the winding spindle. The aperture is defined by a wire access recess insert and an adjacent portion of the winding spindle. The insert is removably attached to the winding spindle within a wire access recess which provides access to a cavity within the winding spindle.

24 Claims, 3 Drawing Sheets

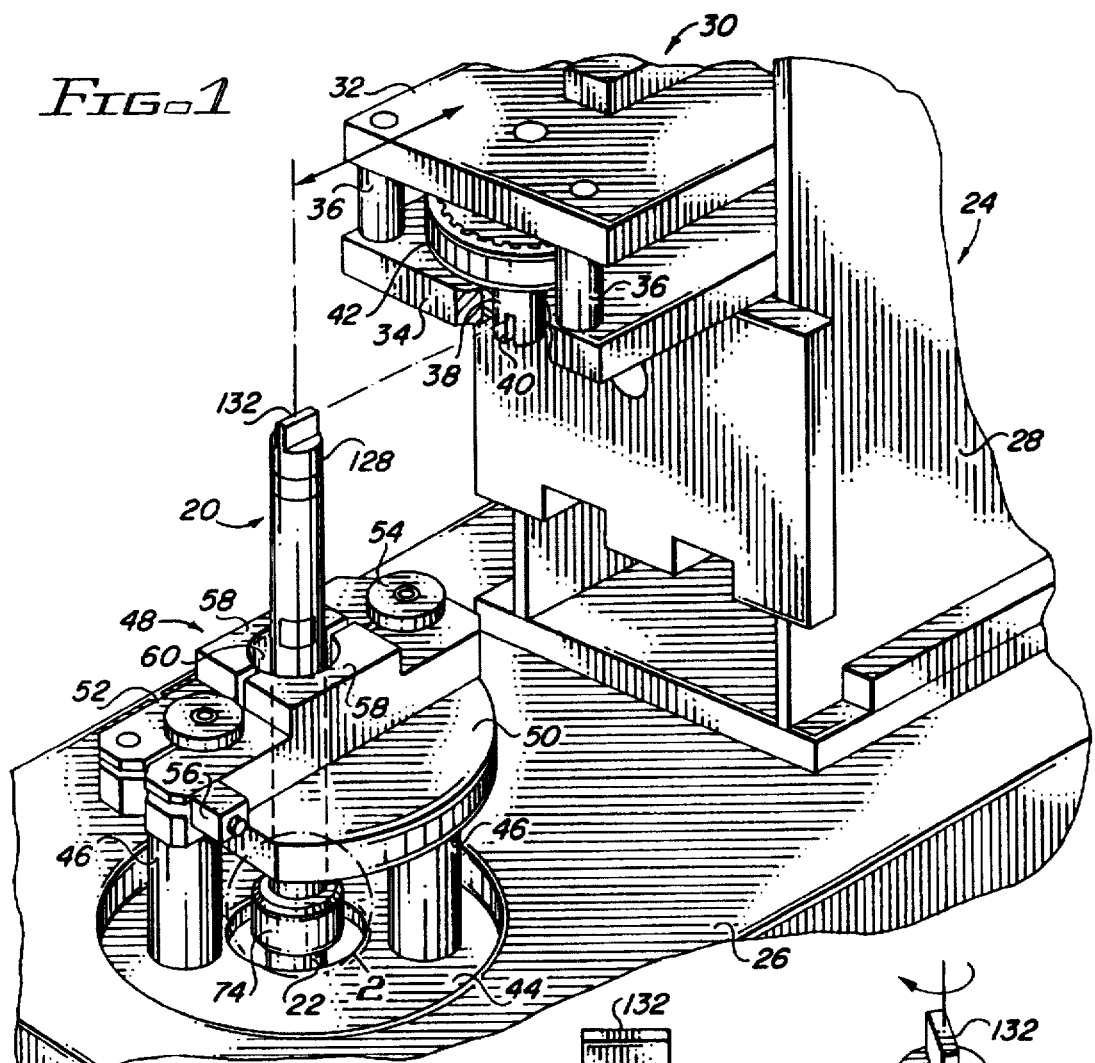

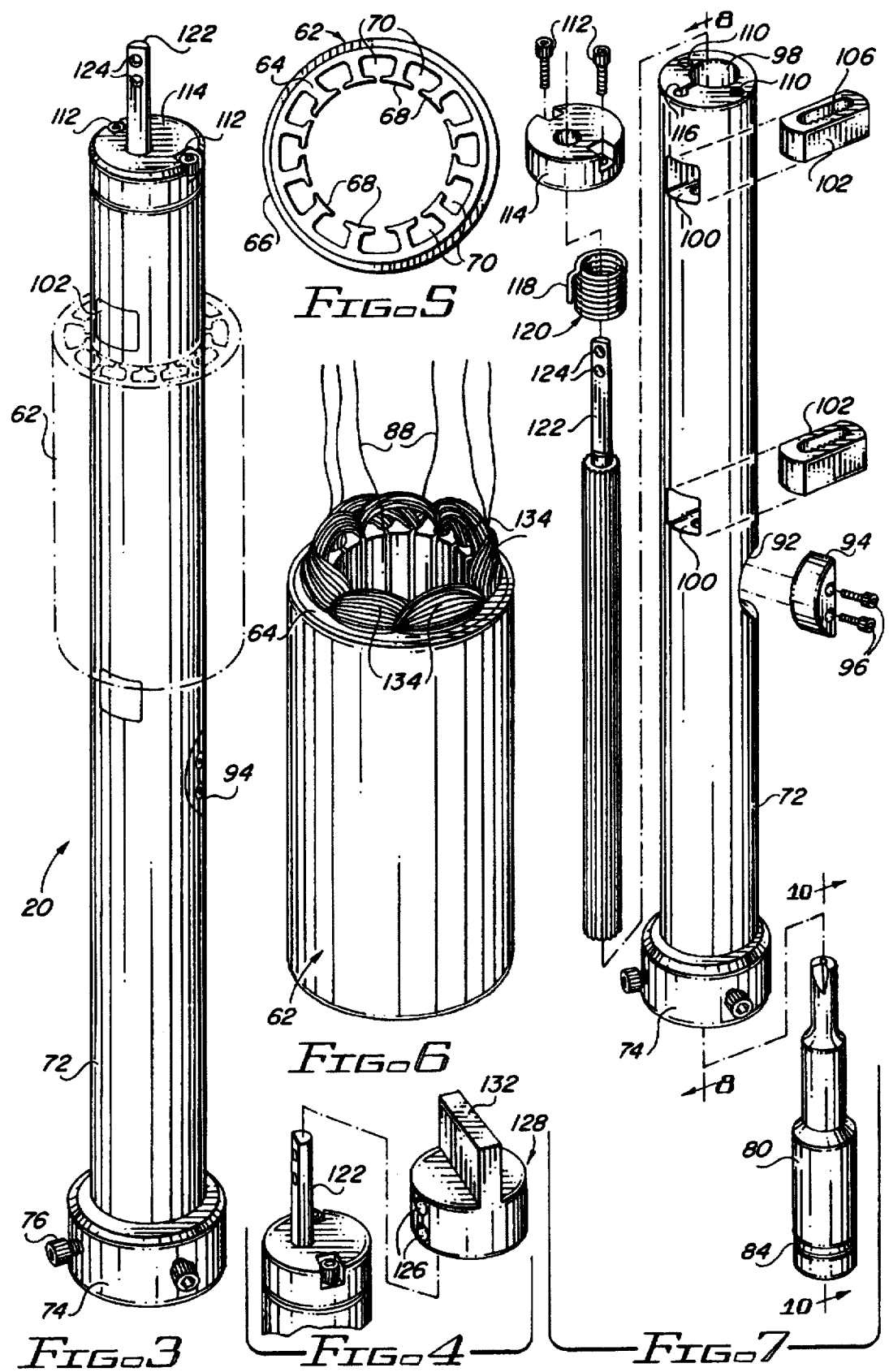

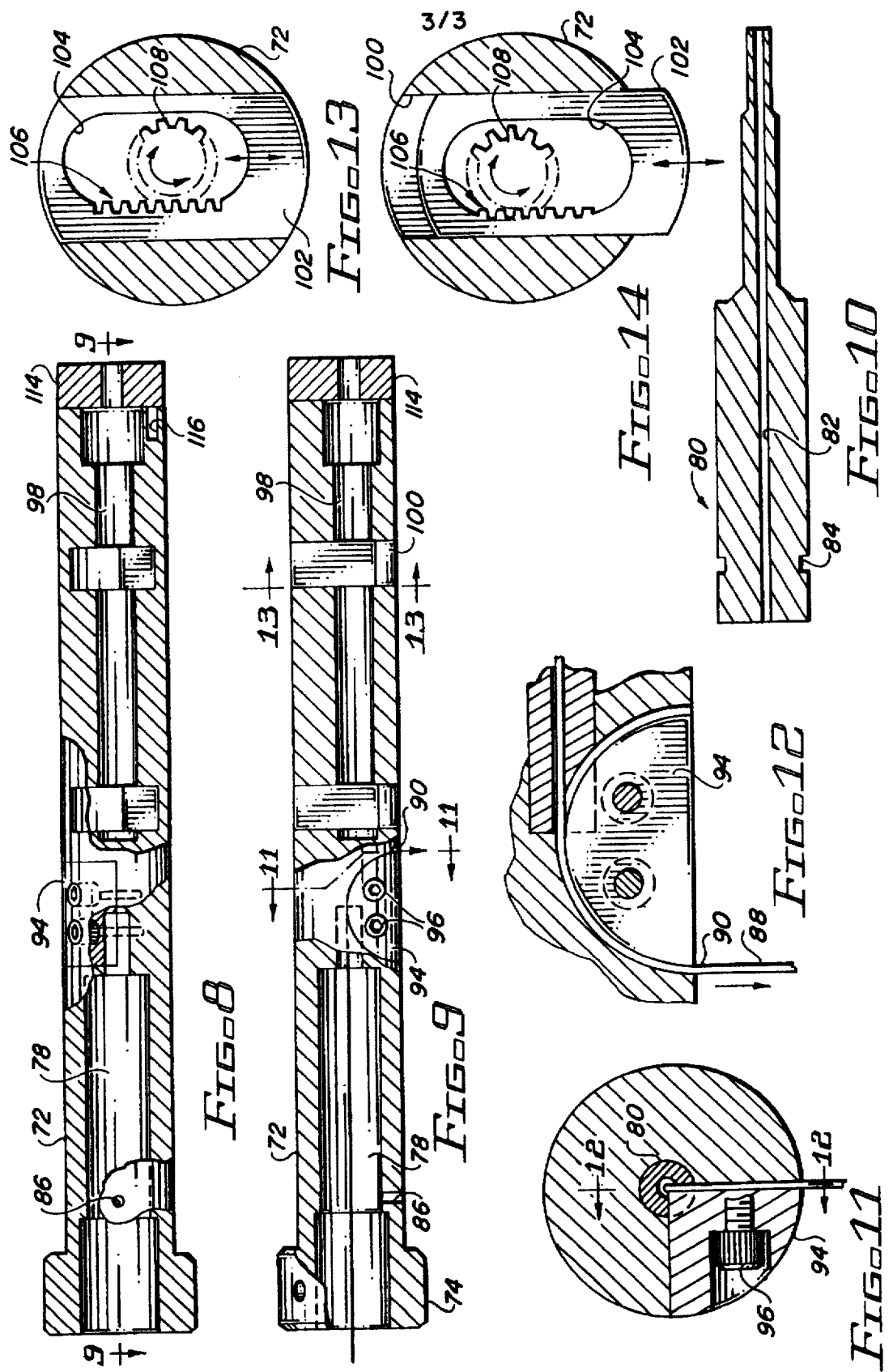

TOOL INCLUDING A WINDING SPINDLE FOR WINDING AND FORMING DYNAMOELECTRIC MACHINE FIELD WINDINGS

BACKGROUND OF THE INVENTION

This invention relates generally to the manufacture of stators for electric motors. More particularly, the present invention relates to a method and apparatus for winding and forming dynamoelectric machine field windings, and particularly, final forming of stator coil end turns.

In many conventional dynamoelectric machines, for example fractional horsepower induction motors, the magnetic stator core comprises a stacked plurality of relatively thin laminations of magnetic material having a central bore which receives the rotor member of the machine. A plurality of slots extend radially inwardly from the bore for receiving the field coils of the machine, wherein such slots are defined by radially extending teeth. A predetermined number of turns of insulated wire conductor are arranged within such slots to form the excitation windings of the motor. These coils have end turn portions extending outside the slots axially beyond the sides or end faces of the stator core.

In the past, two different types of apparatus have been employed for placing dynamoelectric machine field windings in the slots of the stator core member. In the so-called coil-insertion or coil-injection apparatus, prewound coils are first placed on a circular array of elongated blades. The stator core is then positioned on the blades with the blades respectively engaging the inner ends of the stator core teeth, and the coils are then pushed bodily into the stator core member slots. The coils for use with such coil-insertion apparatus are typically formed by securing the free end of the wire to a coil form and then winding or wrapping the wire around the coil form as the wire is withdrawn from the source, the wire being placed in tension as it is being wound.

In the so-called in-place or gun winder, a free end of the wire is secured and a gun is oscillated through the bore of the core member thereby withdrawing the wire from a source and placing it directly in the desired slots. Since the free end of the wire is fixed, the wire is in essence wound around selected teeth which define the slots thereby placing the wire under tension.

After the coils have been placed within the stator core, the return ends of the coils extend out of the stator slots and beyond the ends of the stator core. For reasons of appearance as well as customer specifications, the coil ends need to be shaped into a particular desired configuration. Such shaping operations are conventionally referred to as forming or blocking operations and typically have included a preforming operation wherein the wire was moved out of the extended bore of the stator and a final forming operation in which the end wires were shaped into the desired configuration. In the past, the preforming and final forming operations consisted of two distinct operations wherein, during the preforming operation, a preforming arbor was inserted into and extended through the bore of the stator to push the wires back from the extended stator bore. After this preforming operation the stator was transferred to another machine for final forming of the wire.

Drawbacks associated with prior stator winding and forming apparatus and methods include performing the winding and forming operations at different stations under different procedures. Further, in some prior devices the coil end turn wires have tended to be pinched. Such pinching is likely to undesiveably damage the wire or the wire insulation.

Accordingly, there is a need for a tool for winding and forming dynamoelectric machine field windings which is of relatively simple construction, lends itself to use in a so-called in-place or gun winder, and provides for the winding and forming of field windings in one continuous set of operations. Further, such a tool is needed which minimizes the possibility of damaging the insulation on the windings. The present invention fulfills these needs and provides other related advantages.

SUMMARY OF THE INVENTION

The present invention resides in an improved tool for winding and forming dynamoelectric machine field windings which satisfies the foregoing needs. The tool comprises, generally, an elongated winding spindle, a forming rack movably disposed within the winding spindle, and means for extending and retracting the forming rack generally radially from the winding spindle through a first aperture in an external surface of the winding spindle. Means are further provided for guiding a wire through the winding spindle to a second aperture in the external surface of the winding spindle.

In a preferred form of the invention, the elongated winding spindle is generally cylindrical and has a pair of longitudinally spaced apart, generally radially extending slots therethrough. A pair of forming racks are each slidably disposed within a respective one of the generally radially extending slots. A rotatable shaft is at least partially disposed within the winding spindle for engaging the forming racks in a manner causing sliding movement of the forming racks along the slots in accordance with rotation of the shaft. More particularly in this regard, the forming racks each include a rack of gear teeth, and the shaft comprises a pinion gear. The rotatable shaft has a longitudinal axis disposed parallel to a longitudinal axis of the winding spindle. The forming racks each slide along an axis perpendicular to the longitudinal axis of the rotating shaft.

A wire guiding means includes a replaceable wire feeding insert disposed within a generally longitudinally extending cavity within the winding spindle. The wire feeding insert guides the wire from one end of the winding spindle to the vicinity of the second aperture. The wire guiding means further includes a wire access recess in the external surface of the winding spindle adjacent to the second aperture. A wire access recess insert is removably attached to the winding spindle within the wire access recess such that the wire access recess insert and an adjacent portion of the winding spindle define the second aperture.

Means are provided for biasing the shaft to normally position the forming racks within the winding spindle in the absence of a positive rotating force applied to the shaft. The biasing means includes a spring having one end fixed relative to the shaft and another end fixed relative to the winding spindle.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented perspective environmental view illustrating a winding and forming tool manufactured in accordance with the present invention, mounted to a winding machine spindle shaft;

FIG. 2 is a fragmented, partially sectional view taken of the area indicated by the arrow 2 in FIG. 1, illustrating the manner in which a collar is formed integrally with a winding spindle, which collar is attached to an upper end of the winding machine spindle shaft;

FIG. 3 is an enlarged top plan and front elevational perspective view of the winding and forming tool shown in FIG. 1 and comprising the present invention, wherein a top cap is removed to show an upper end of a spindle shaft extending through a spring retainer cap, and further illustrating an exemplary stator in phantom;

FIG. 4 is an exploded perspective view of the top end of the winding and forming tool shown in FIG. 3, illustrating the top cap to be attached over the spring retainer cap and fixed to the upper end of the spindle shaft;

FIG. 5 is a top plan view of an exemplary stator housing;

FIG. 6 is a top plan and front elevational perspective view of the stator housing shown in FIG. 5, further illustrating the manner in which field windings are assembled thereto;

FIG. 7 is an exploded perspective view of the components of the winding and forming tool illustrated in FIG. 3;

FIG. 8 is a sectional view of the winding spindle taken generally along the line 8—8 of FIG. 7;

FIG. 9 is a partially sectional view of the winding spindle taken generally along the line 9—9 of FIG. 8;

FIG. 10 is an enlarged sectional view of a wire feeding insert taken generally along the line 10—10 of FIG. 7;

FIG. 11 is an enlarged, partially sectional view taken generally along the line 11—11 of FIG. 9;

FIG. 12 is an enlarged fragmented sectional view taken generally along the line 12—12 of FIG. 11;

FIG. 13 is an enlarged sectional view taken generally along the line 13—13 of FIG. 9, illustrating a rack in its retracted position;

FIG. 14 is an enlarged sectional view taken generally along the line 13—13 of FIG. 9, illustrating the rack in an extended position;

FIG. 15 is a fragmented perspective view of the winding and forming tool of the present invention having a stator housing position over a portion thereof, wherein the forming racks are in their retracted positions; and FIG. 16 is a view similar to that shown in FIG. 15, wherein the top cap has been rotated to extend the forming racks radially outwardly.

DETAILED DESCRIPTION OF THE PREFERRED EMBODIMENT

As shown in the drawings for purposes of illustration, the present invention is concerned with an improved tool for winding and forming dynamoelectric machine field windings, generally designated in the accompanying drawings by the reference number 20. The winding and forming tool 20 is typically mounted onto a winding machine spindle shaft 22 which is part of a stator winding machine 24.

With reference to FIG. 1, the exemplary stator winding machine 24 includes a base 26 on which is positioned a vertically adjustable support structure 28 for a linear slide table 30. The linear slide table 30 includes an upper plate 32 and a lower plate 34 spaced by bushings 36. A cap rotator 38 having a vertical slot 40 is rotatably positioned by a pulley drive 42 which is situated between the upper and lower plates 32 and 34. The linear slide table 30 extends horizontally from the support structure 28 to engage the cap rotator 38 with an upper portion of the winding and forming tool in a manner to be described more fully below.

Adjacent to the support structure 28 is an aperture in the base 26 in which is positioned a rotatable index table 44. Extending upwardly from the index table 44 are several support legs 46 which support a stator nest clamp assembly 48. The clamp assembly 48 includes a stationary nest clamp 50 which is securely attached to the index table 44 by the support legs 46, and a pivotal nest clamp 52 which rotates about a pivot post 54 at one end and is secured to the stationary nest clamp 50 at another end with a lock nut 56. Each nest clamp 50 and 52 includes a central stator clamping section 58 having an internal semi-cylindrical clamping face 60 which engages an outer cylindrical surface of a stator 62 for securely holding the stator in place. For purposes of illustration only, the stator 62 is not shown in FIG. 1, although it will be readily understood by those of ordinary skill in the art that a stator is secured by the clamp assembly 48 during the winding and forming operation.

With reference to FIGS. 5 and 6, the exemplary stator 62 comprises an internally slotted, laminated stator core member 64 encased within a cylindrical stator housing sleeve 66. Internally, the core member 64 includes a plurality of poles 68 which define therebetween winding slots 70. The winding slots 70 need not extend vertically the length of the stator 62, but may have a skew angle which is defined as the angular difference between the top and bottom ends of any one particular winding slot perpendicular to a longitudinal axis of the stator 62. In the case of the exemplary stator 62 shown, wherein the winding slots extend vertically, the skew angle is zero degrees (0°).

In accordance with the present invention, and with specific reference to FIGS. 2–4 and 7–16, the winding and forming tool 20 comprises a generally cylindrical, elongated winding spindle 72 which has an integral collar 74 at a lower end which is secured to an upper end of the winding machine spindle shaft 22 by means of lock bolts 76. An internal cavity 78 is provided within the winding spindle 72, extending upwardly from its lower end, into which is inserted a wire feeding insert 80. The wire feeding insert 80 includes a wire guide passageway 82 which is preferably aligned with the longitudinal axis of the winding spindle 72. The wire feeding insert 80 also includes a peripheral groove 84 for receiving a set screw through an aligned aperture 86 in a wall of the winding spindle 72 (see FIGS. 8–10). The wire feeding insert 80 provides means for guiding an insulated wire 88 internally through the winding spindle 72 from a lower end thereof to the vicinity of a wire exit aperture 90 in a radially facing external surface of the winding spindle.

The winding spindle 72 includes a wire access recess 92 (FIG. 7) adjacent to the wire exit aperture 90. The recess 92 is configured to receive a wire access recess insert 94 which is held in place by means of insert screws 96. The insert 94 and an adjacent portion of the winding spindle 72 define the wire exit aperture 90. As best seen in FIGS. 7–9, 11 and 12, removal of the insert 94 from the recess 92 permits access to a terminal end of the wire feeding insert 80 to ensure passage of the wire through the wire exit aperture 90.

An upper portion of the winding spindle 72 includes a longitudinally extending internal cavity 98 having a longitudinal axis extending parallel to but spaced radially from the longitudinal axis of the winding spindle 72 itself. This portion of the winding spindle further includes a pair of longitudinally spaced apart, generally radially extending slots 100 which each slidably receive therein a respective forming rack 102. The distance between the slots 100 and, thus, the forming racks 102 generally corresponds with the length of the stator 62. Also, the racks 102 may be angularly displaced from one another radially along the longitudinal axis of the winding spindle 72 such that the angular displacement corresponds with the skew angle of the winding slots 70. As shown, the skew angle is zero degrees, therefore the slots 100 and the forming racks 102 are vertically aligned with one another.

Each of the forming racks 102 includes a centrally disposed closed slot 104 having a rack of gear teeth 106 along one side of the slot 104. These gear teeth 106 engage the gear teeth of a rotatable spline shaft 108 which is disposed within and along the entire length of the upper internal cavity 98. Rotation of the shaft 108 causes the forming racks 102 to extend and retract from the winding spindle 72, in unison, in accordance with rotation of the shaft 108.

The upper end of the winding spindle 72 includes three recesses. Two of these recesses 110 are threaded to receive retaining screws 112 utilized to secure a spring retainer cap 114 onto the upper end of the winding spindle 72. The third recess 116 receives an end 118 of a coil spring 120 which is positioned about an upper end of the spline shaft 108 within the upper internal cavity 98. An opposite end of the coil spring 120 is disposed to engage the gear teeth of the spline shaft 108 so that the spring 120 provides means for biasing the shaft 108 to normally position the forming racks 102 within the winding spindle 72 in the absence of a positive rotating force applied to the shaft 108.

As shown in FIGS. 4 and 7, an upper end 122 of the shaft 108 extends through the spring retainer cap 114. This upper end 122 includes a pair of recesses 124 spaced for alignment with a pair of threaded apertures 126 in a top cap 128. The top cap 128 is placed over the upper end 122 of the spline shaft 108 and retaining screws 130 are threaded through the apertures 126 for engagement into the recesses 124 to secure the top cap 128 in place at the upper end of the winding and forming tool 20. The top cap 128 includes a flange-like upper key 132 which may be engaged by the vertical slot 40 of the cap rotator 38.

In use, the winding and forming tool 20 is secured to the stator winding machine 24 by attaching the collar 74 to the winding machine spindle shaft 22 (FIG. 2). The winding machine spindle shaft reciprocates the winding and forming tool 20 vertically to guide wire 88 as it is being pushed or pulled through the wire exit aperture 90 and wind it through selected winding slots 70 of the stator 62. The winding machine spindle shaft 22 also pivots at each end of the upward and downward stroke thereof to facilitate this winding of the wire 88 onto the stator 62.

The stator 62 is placed over the winding and forming tool 20 as shown in FIG. 15, and clamped into place within the stator nest clamp assembly 48. Rotation of the index table 44 permits the stator winding machine to appropriately position the stator 62 for placing field windings within the entire inner circumference of the stator 62.

As the wire 88 being pushed or pulled through the wire exit aperture 90 is utilized to create electromagnetic coils within the stator 62, occasionally the end turn portions 134 of the coils must be pushed radially outwardly or "formed" to meet manufacturer's specifications. At suitable junctures during the winding process, the linear slide table 30 extends from the support structure 28 so that the vertical slot 40 of the cap rotator 38 engages the key 132 of the top cap 128. The cap rotator is then caused to pivot by means of the pulley drive 42, thus turning the top cap 128 relative to the winding spindle 72. This causes the spline shaft 108 to likewise rotate, thus causing the forming racks 102 to extend outwardly from the winding spindle 72 to engage the end turn portions 134 of the coils. When the required forming operation is completed, the cap rotator 38 disengages from the top cap 128, and the coil spring 120 ensures that the spline shaft 108 is rotated to retract the forming racks 102 completely within the winding spindle 72 (FIGS. 13–16).

From the foregoing it will be appreciated that the tool 20 of the present invention incorporates both a winding tool and an end-turn forming tool into a single apparatus, thus permitting both operations to be accomplished using a single tool. Additionally, by utilizing a pair of forming racks 102 spaced substantially to coincide with the length of the stator 62, both ends of the stator coils may be formed at the same time. The radius of the tool 20 is designed to closely match the desired radius of the coil. This approach greatly reduces the chance of damage to the individual wires of the coil since little force is applied to the wire strands at the entrance and exit of the stator slots where they are most vulnerable to forming damage caused by pinched wires. Of course, the winding and forming tool 20 could be modified to form two sets of coils in a single operation. All that need be added are additional forming racks 102 which operate along the same principles as those shown in the exemplary embodiment.

Although a particular embodiment of the invention has been described in detail for purposes of illustration, various modifications may be made without departing from the spirit and scope of the invention. Accordingly, the invention is not to be limited, except as by the appended claims.

I claim:

1. A tool for winding and forming dynamoelectric machine field windings, comprising:
   an elongated winding spindle defining a longitudinal spindle axis and including a radially facing external face;
   an elongated forming rack movably disposed within the winding spindle, said forming rack defining a longitudinal forming rack axis extending perpendicular to the longitudinal spindle axis and including an end face;
   means for guiding the forming rack in radially extending linear movement parallel to the longitudinal axis of the forming rack;
   said means for guiding the forming rack comprising radially extending guide surfaces extending inwardly from the radially facing surface of the spindle and defining a first aperture, and said means for guiding the forming rack further comprising radially extending surfaces on the forming rack cooperating in sliding engagement with respective ones of the guide surfaces on the spindle;
   means for extending and retracting the forming rack generally radially from the winding spindle through the first aperture in the winding spindle whereby the forming rack moves lengthwise through the first aperture along a path generally parallel to the longitudinal forming rack axis and said end face moves from a location adjacent to said radially facing surface to a location spaced radially outwardly from said radially facing surface;
   a second aperture defined in the radially facing external surface of the winding spindle; and
   means for guiding a wire through the winding spindle to the second aperture.

2. The tool of claim 1, wherein the first aperture defines an end of a generally radially extending slot through the winding spindle, and wherein the forming rack is slidably disposed therein.

3. The tool of claim 2, wherein the extending and retracting means comprises a rotatable shaft at least partially disposed within the winding spindle for engaging the forming rack in a manner causing sliding movement of the forming rack along the slot in accordance with rotation of the shaft.

4. The tool of claim 3, wherein the forming rack includes a rack of gear teeth and wherein the shaft comprises a spline shaft.

5. The tool of claim 3, including means for biasing the shaft to normally position the forming rack within the winding spindle in the absence of a positive rotating force applied to the shaft.

6. The tool of claim 5, wherein the biasing means includes a spring having one end fixed relative to the shaft and another end fixed relative to the winding spindle.

7. The tool of claim 1, wherein the wire guiding means includes a replaceable wire feeding insert disposed within a generally longitudinally extending cavity within the winding spindle, which wire feeding insert guides the wire internally through the winding spindle from an end thereof to the vicinity of the second aperture.

8. The tool of claim 7, wherein the wire guiding means further includes a wire access recess in the external surface of the winding spindle adjacent to the second aperture, and a wire access recess insert removably attached to the winding spindle within the wire access recess, wherein the wire access recess insert and an adjacent portion of the winding spindle define the second aperture.

9. The tool of claim 1, wherein the winding spindle includes a collar at one end thereof, for attaching the winding spindle to a winding machine spindle shaft.

10. The tool of claim 1, wherein the forming rack extends from a location adjacent the longitudinal spindle axis to a location where the end face of the forming rack faces outwardly from the radially facing surface of the spindle.

11. A tool for winding and forming dynamoelectric machine field windings, comprising:

an elongated winding spindle defining a longitudinal spindle axis and including a radially facing external surface, said winding spindle further having a pair of longitudinally spaced apart, generally radially extending slots therethrough;

a pair of elongated forming racks each being slidably disposed within a respective one of the generally radially extending slots, each said forming rack defining a respective longitudinal forming rack axis extending perpendicular to the longitudinal spindle axis and including a respective end face;

means for guiding the forming racks in radially extending linear movement parallel to the longitudinal axis of the forming rack;

said means for guiding the forming racks comprising radially extending guide surfaces extending inwardly from the radially facing surface of the spindle and extending through the spindle to define the pair of longitudinally spaced slots, and said means for guiding the forming racks further comprising radially extending surfaces on the respective forming racks cooperating in sliding engagement with respective ones of the guide surfaces on the spindle;

means for extending and retracting the forming racks relative to the winding spindle whereby each said forming rack moves lengthwise through a respective slot along a path generally parallel to a respective longitudinal forming rack axis and said end faces move from locations adjacent to said radially facing surface to locations radially outwardly from said radially facing surface;

an aperture defined in the radially facing external surface of the winding spindle for receiving a wire; and means for guiding wire internally through the winding spindle from one end thereof to the aperture defined in the radially facing external surface of the winding spindle.

12. The tool of claim 11, wherein the wire guiding means includes a replaceable wire feeding insert disposed within a general longitudinally extending cavity within the winding spindle, which wire feeding insert guides the wire from the one end of the winding spindle to the vicinity of the aperture.

13. The tool of claim 12, wherein the wire guiding means further includes a wire access recess in the external surface of the winding spindle adjacent to the aperture, and a wire access recess insert removably attached to the winding spindle within the wire access recess, wherein the wire access recess insert and an adjacent portion of the winding spindle define the aperture.

14. The tool of claim 11, wherein the extending and retracting means comprises a rotatable shaft at least partially disposed within the winding spindle for engaging the forming racks in a manner causing sliding movement of the forming racks along the slots in accordance with rotation of the shaft.

15. The tool of claim 14, wherein the rotatable shaft has a longitudinal axis disposed parallel to the longitudinal axis of the winding spindle.

16. The tool of claim 14, wherein the forming racks each include a rack of gear teeth, and wherein the shaft comprises a pinion gear.

17. The tool of claim 16, including means for biasing the shaft to normally position the forming racks within the winding spindle in the absence of a positive rotating force applied to the shaft.

18. The tool of claim 17, wherein the biasing means includes a spring having one end fixed relative to the shaft and another end fixed relative to the winding spindle.

19. The tool of claim 11, wherein the forming racks each extend from a location adjacent the longitudinal spindle axis to a location where the end face of the forming rack faces outwardly from the radially facing surface of the spindle.

20. A tool for winding and forming dynamoelectric machine field windings, comprising:

a generally cylindrical winding spindle having a pair of longitudinally spaced apart, generally radially extending slots therethrough;

a pair of forming racks each being slidably disposed within a respective one of the generally radially extending slots;

a rotatable shaft at least partially disposed within the winding spindle for engaging the forming racks in a manner causing sliding movement of the forming racks along the slots in accordance with rotation of the shaft to extend and retract the forming racks relative to the winding spindle; and means for guiding a wire internally through the winding spindle from one end thereof to an aperture in a radially facing external surface of the winding spindle, the wire guiding means including a wire access recess in the external surface of the winding spindle adjacent to the aperture, and a wire access recess insert removably attached to the winding spindle within the wire access recess, wherein the wire access recess insert and an adjacent portion of the winding spindle define the aperture.

21. The tool of claim 20, including a spring having one end fixed relative to the shaft and another end fixed relative to the winding spindle, for biasing the shaft to normally position the forming racks within the winding spindle in the absence of a positive rotating force applied to the shaft.

22. The tool of claim 20, wherein the rotatable shaft has a longitudinal axis disposed parallel to a longitudinal axis of the winding spindle, and wherein the forming racks each slide along an axis perpendicular to the longitudinal axis of the rotatable shaft.

23. The tool of claim 20, wherein the forming racks each include a rack of gear teeth, and wherein the shaft comprises a pinion gear.

24. The tool of claim 20, wherein the wire guiding means includes a replaceable wire feeding insert disposed within a generally longitudinally extending cavity within the winding spindle, which wire feeding insert guides the wire from the one end of the winding spindle to the vicinity of the aperture.

* * * * *